United States Patent
Schöder et al.

(10) Patent No.: US 7,427,163 B2
(45) Date of Patent: Sep. 23, 2008

(54) SELF-ALIGNING ANTIFRICTION BEARING AND CAGE FOR SAID SELF-ALIGNING ANTIFRICTION BEARING

(75) Inventors: Rainer Schöder, Egenhausen (DE); Martin Grehn, Dittelbrunn (DE)

(73) Assignee: Schaeffler KG (DE)

( * ) Notice: Subject to any disclaimer, the term of this patent is extended or adjusted under 35 U.S.C. 154(b) by 298 days.

(21) Appl. No.: 10/569,336

(22) PCT Filed: Aug. 17, 2004

(86) PCT No.: PCT/DE2004/001828

§ 371 (c)(1),
(2), (4) Date: Feb. 21, 2006

(87) PCT Pub. No.: WO2005/019666

PCT Pub. Date: Mar. 3, 2005

(65) Prior Publication Data

US 2007/0053624 A1   Mar. 8, 2007

(30) Foreign Application Priority Data

Aug. 20, 2003  (DE) ............................... 103 38 207

(51) Int. Cl.
*F16C 19/49*  (2006.01)

(52) U.S. Cl. .................. 384/494; 384/495; 384/558

(58) Field of Classification Search .................. 384/494, 384/495, 523–534, 496, 497, 504, 512, 450, 384/558, 552, 568
See application file for complete search history.

(56) References Cited

U.S. PATENT DOCUMENTS

| | | | | | |
|---|---|---|---|---|---|
| 956,588 | A | * | 5/1910 | Lockwood | 384/494 |
| 956,676 | A | * | 5/1910 | Bright | 384/552 |
| 980,082 | A | * | 12/1910 | Eitner | 384/531 |
| 1,351,754 | A | * | 9/1920 | Hubard | 384/494 |
| 4,505,523 | A | * | 3/1985 | Stephan | 384/445 |
| 4,799,809 | A | * | 1/1989 | Kuroiwa | 384/522 |
| 6,926,446 | B2 | * | 8/2005 | Grehn et al. | 384/494 |

FOREIGN PATENT DOCUMENTS

| | | | |
|---|---|---|---|
| DE | 3529359 A1 | * | 2/1987 |
| DE | 8803970 U | | 5/1988 |
| FR | 1083678 A | | 1/1955 |

* cited by examiner

*Primary Examiner*—Thomas R Hannon
(74) *Attorney, Agent, or Firm*—Lucas & Mercanti, LLP

(57) ABSTRACT

The invention relates to a self-aligning antifriction bearing (1) comprising at least one first row (9) of rolling bodies (11) and a second row (10) of rolling bodies (11) adjacent to said first row (9) of rolling bodies (11), whereby every row (9, 10) comprises balls (5) and rollers (6) disposed peripherally about a central axis of the self-aligning antifriction bearing (1). The bearing is characterized in that the balls (5) have a greater outer diameter (28) than the rollers (6).

13 Claims, 5 Drawing Sheets

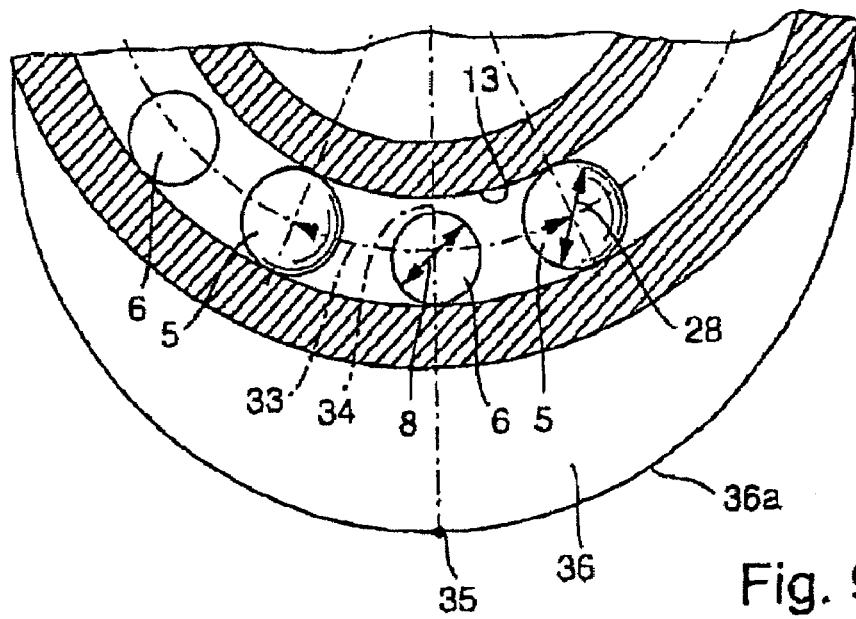
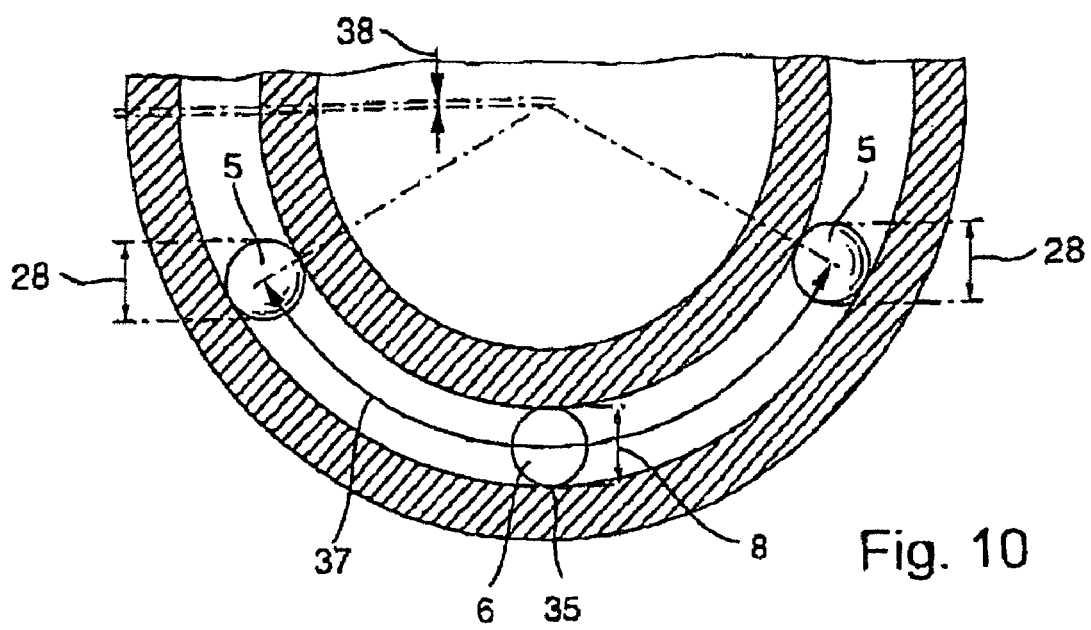

SELF-ALIGNING ANTIFRICTION BEARING AND CAGE FOR SAID SELF-ALIGNING ANTIFRICTION BEARING

FIELD OF THE INVENTION

Self-aligning antifriction bearing comprising at least a first row of rolling elements and comprising a second row of rolling elements adjacent to the first row of rolling elements.

BACKGROUND TO THE INVENTION

The self-aligning roller bearings and barrel roller bearings denoted by the term self-aligning antifriction bearings are used in applications in which an angular error between the housing and the shaft has to be compensated. Through the use of the rolling element roller with line contact between the outer and inner ring, these bearings are suitable for high loads. If the load upon the antifriction bearing is low, the rollers tend to slide between the raceways due to the absence of rolling contact. The rotation speed of the cage carrying the rolling elements falls to normal under rolling contact. In the event of an abrupt rise in load upon the rolling element, the antifriction bearing, the rolling element, which then enters into engagement between the outer and inner ring, must accelerate the whole of the cage carrying all the other rolling elements, within fractions of a second, to the correct rotation speed. This acceleration process generates high forces in the cage. The resultant slippage between the accelerated rollers and the raceways of the outer and inner ring leads to damage to the rolling elements and to the raceways.

The aforesaid problem arises, for example, in applications in which the rolling elements, in normal operation, are only put under low load. In the event of abrupt increases in load, the self-aligning antifriction bearings are briefly subjected to peak loads which can lead to the effect described above.

In DE 8803970 U1, a radial antifriction bearing is described, in which rollers and balls are jointly used as rolling elements. The self-aligning antifriction bearing of the generic type is provided with at least a first row of rolling elements and a second row of rolling elements adjacent to the first row of rolling elements. Each of the rows has a row of barrel rollers disposed peripherally about a bearing center axis of the self-aligning antifriction bearing. In addition, in the self-aligning antifriction bearing, a row of balls is disposed. In the bearing according to DE 8803970 U1, the basic load rating is said to be increased by the additional row of balls. The consequences of brief increases in load are not solved with this realization.

In such types of bearings of the prior art, the balls, because of their punctual contact surface with the raceways during operation of the self-aligning antifriction bearing, are intent upon assuming a kinematically optimal position. This generally leads to constrained axial motions on the part of the balls. The balls are consequently supported, especially laterally, in the cage pockets against the forces arising from the constrained motions. Increased friction, combined with higher operating temperatures and wear in the ball pockets, are the result. The mountings for the balls in the pockets are endangered and may possibly suffer premature wear. A cage described in DE 8803970 U1, due to the ball pockets situated axially between the pockets for the rollers, can only be produced at relatively high cost.

SUMMARY OF THE INVENTION

The object of the invention is therefore to provide a self-aligning antifriction bearing and a cage for said self-aligning antifriction bearing with which the above-described drawbacks can be prevented.

The object according to the invention is achieved according to the subject of claim 1 and further embodiments of the invention according to the dependent claims. The self-aligning antifriction bearing is provided with at least a first row of rolling elements and with a second row of rolling elements adjacent to the first row of rolling elements. Each of the rows has balls and barrel rollers, or otherwise spherically shaped rollers., disposed peripherally about the bearing center axis of the self-aligning antifriction bearing. It is here conceivable for each of the rollers to be followed in the peripheral direction by one of the balls. Alternatively, the balls are mutually separated in the peripheral direction by two or more of the rollers.

The balls are here provided with an equal nominal diameter common to all the balls in the bearing. The smallest external diameter of the balls which is within the permitted tolerance of the diameter of the balls is greater than a largest external diameter of the barrel rollers. The rollers here have a nominal diameter which is common to all the rollers in the bearing. The largest external diameter of the rollers is the largest diameter which deviates within the tolerance from the nominal diameter of the rollers.

Each imaginary first rolling contact plane of the balls per row, which plane is concentric to the bearing center axis and is drawn annularly about the center axis and runs centrally through the balls, and each imaginary second rolling contact plane of the rollers per row, which plane is concentric to the center axis and intersects the rollers at the largest external diameter, are in each of the rows axially spaced apart along the bearing center axis. Preferably, the first rolling contact planes of the balls from row to row lie axially closer together than the second rolling contact planes of the rollers from row to row. Hence, the first rolling contact planes of the balls are disposed along the center axis and thus axially between the second rolling contact planes of the barrel rollers. The closer together the rolling contact planes of the mutually adjacent ball rows are moved in the direction of the transverse center plane of the bearing, the smaller are the constrained forces upon the balls. The fact that the balls and the rollers lie peripherally together respectively in a row means that the cage is easier to produce and the bearing is narrower, and thus lighter, in total, and also cheaper to produce.

The balls bear the radial load alone when the bearing is under low load. In the event of higher or peak loads, the rollers lend support. As a result of the point contact between raceway and ball, higher Hertzian stresses are generated than with a line contact between roller and raceway. The comparatively higher stress in the rolling contact with the balls at low load leads to less slippage between the rolling elements. Mixed friction or solid friction in the contact between the raceways and the rolling elements are prevented. This effect is further enhanced by the fact that just the balls, and not, therefore, the entire number of rolling elements, are engaged. The load is thus distributed to fewer rolling elements, whereby the stresses in the rolling contact are increased. The roller ring, comprising roller and cage, is dragged along by the balls under low load.

At the moment of peak load, the minimally larger balls which are present in the load zone are elastically deformed in accordance with their spring load-deflection curve, to the point where the rollers lend support. This prevents the formation of stresses in the bearing which would lead to a plastic deformation of the balls and the raceways in rolling contact with the balls. The abrupt acceleration forces upon the roller ring are prevented, since the roller ring is already set in operating speed by the rollers. The nominal diameter of the balls is greater than the diameter of the rollers, preferably within a range of 0.005% to 0.4% of the largest nominal diameter of the rollers.

With one embodiment, the invention provides a cage for at least one of the rows of the self-aligning antifriction bearing. Preferentially, however, a cage is used which guides both the rows simultaneously. The cage has ball pockets comprising, respectively, a lateral opening. This cage is also known to experts as a cam or double-cam cage. Each of the openings of the pockets of a row is configured on a side of the cage which is facing away from the other of the rows. The, in the peripheral direction of the bearing, tangential free apertural measure of the opening is smaller than the external diameter of the ball, so that the ball is also detained against the side of the opening in the pocket. The opening is also of use when the balls are snap-locked into the cage from outside, since the pocket, which around the periphery of the pocket is not closed, expands further elastically and the snap-in forces are thereby smaller. The catch flange is thus protected from damage when the balls are installed in the cage.

Preferentially, each of the ball pockets has respectively a flange on a radially outward facing rim. The largest clear distance, at least between portions of the flange which lie tangentially opposite one another in the peripheral direction and are in this case farthest removed from one another, is less than the sum of the external diameter of the ball in the pocket, plus a greatest possible motional play in the pocket. The motional play is a clear distance between the pocket and the respective ball in the pocket radially beneath the flange. The flange thus embraces the ball above the pitch circle diameter of the row of balls. Included in the largest clear distance between the portions of the flange is also a greatest possible free motional play between the ball in the pocket and the flange, so that the ball in the pocket is held freely movable relative to the flange to the extent of the motional play, yet is held radially outward by the flange.

Preferably, the entire radially outwardly directed rim of each of the ball pockets is bounded by the flange. The flange thus extends from one end of the pocket at the opening, around the ball, as far as the opposite end of the pocket at the opening.

According to a further embodiment of the invention, the flange has an inner surface portion of a circular cylinder, the inner surface portion facing the ball in the pocket and, peripherally, partially encompassing the ball as far as the opening. The surface portion is described by a radius. The height of the surface portion, directed transversely to the radius, decreases from that of the opening on the farthest side of the pocket in the direction of the opening.

BRIEF DESCRIPTION OF THE DRAWINGS

Further embodiments of the invention and exemplary embodiments of the invention are described in greater detail below with reference to FIGS. 1 to 10, in which, specifically:

FIGS. 9 and 10 show a schematic representation of the size relationships between barrel rollers and balls in comparison.

DETAILED DESCRIPTION OF THE DRAWINGS

Figure 1:
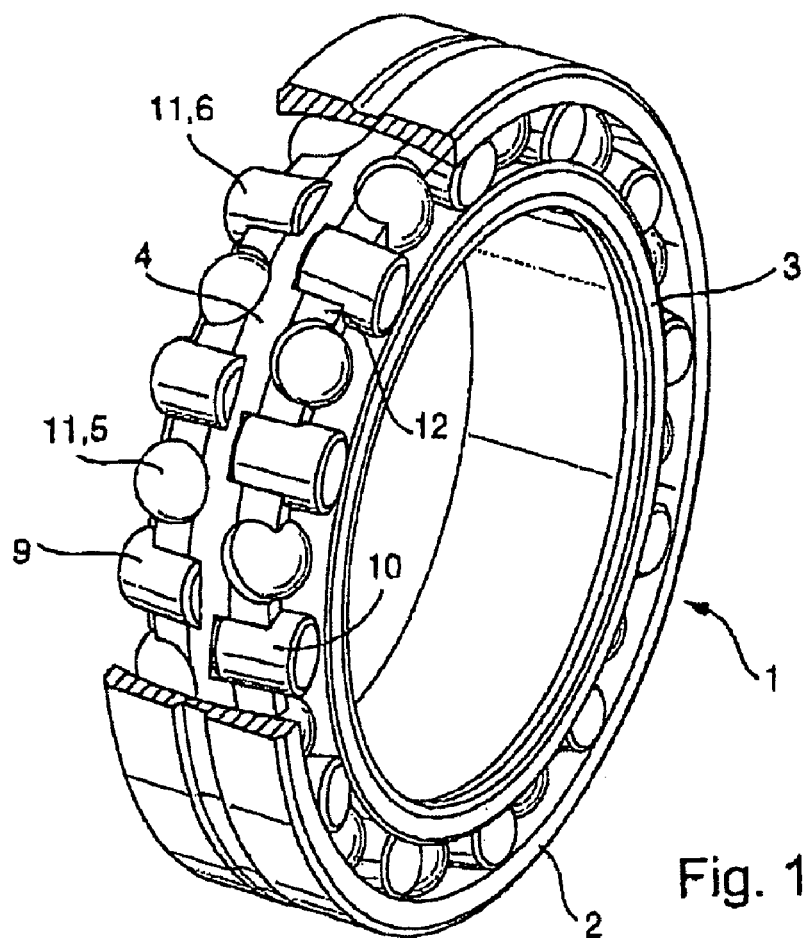
FIG. 1 shows an illustrative embodiment of a self-aligning antifriction bearing in a partially cut general view.

In FIG. 1, a preferred embodiment of a self-aligning antifriction bearing 1 is shown. The self-aligning antifriction bearing 1 is provided with an outer ring 2, an inner ring 3 and with rolling elements 11 disposed between the outer and inner ring. The rolling elements 11 are configured as balls 5 and as rollers 6 and are guided by a common cage 4. In further applications, however, a split cage is also conceivable, which guides each row 9 and 10 of rolling elements 11 separately.

The balls 5 are minimally larger in diameter than the rollers 6. The rollers 6 and balls 5 are respectively disposed alternately in the peripheral direction in one of rows 9 and 10, so that, in the peripheral direction of the self-aligning antifriction bearing 1, each of the balls 5 in one of rows 9 and 10 is adjoined by one of the rollers 6. In addition, each of the balls 5 of the first row 9 is adjoined by a gap 12 between a ball 5 and a roller 6 of the second row 10. When dimensioning the diameter of the balls 5 and the diameter 8 of the rollers 6, care should be taken to ensure that, in the event of a low antifriction bearing load, the rollers between two adjacent balls in rolling contact do not simultaneously touch both raceways 13 and 14. In the event of a first, low bearing load, the load is borne solely by the balls 5, while the rollers 6 roll without any load.

When setting out the diameter difference 7 (FIG. 2a) from the ball 5 to the roller 6, care should be taken to ensure that, in the event of a possible second bearing load of the self-aligning antifriction bearing 1, which here increases to the maximal bearing load, the balls 5 do not plastically deform. A possible practical measurement for the diameter difference 7 between the larger ball 5 and the smaller roller 6 is, for example, a measure of two hundredths of a millimeter.

A further embodiment (not represented) provides for a plurality of rollers to be disposed between two balls. It should here be borne in mind that, as the number of load-bearing rollers 5 in the load zone of the bearing under the first bearing load decreases, the self-aligning antifriction bearing 1, and a shaft supported by means of the self-aligning antifriction bearing 1, runs radially less and less smoothly.

Figure 2A:
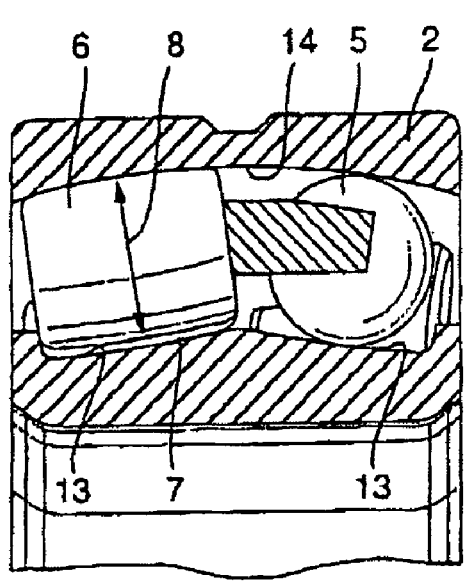
FIGS. 2a, 2b show part-sections through the self-aligning antifriction bearing according to FIG. 1.
Figure 2B:
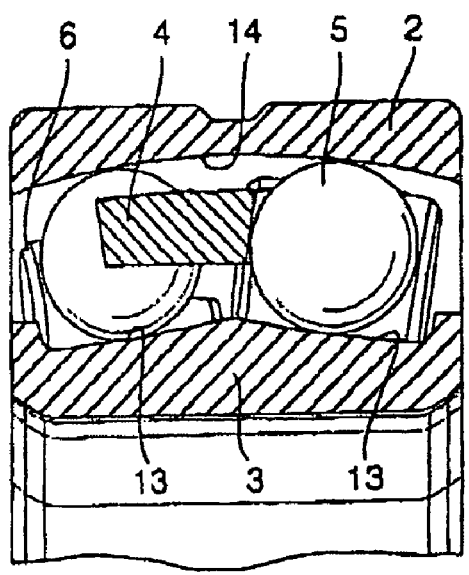

In FIGS. 2a and 2b, the self-aligning antifriction bearing 1 is shown in part-sections. In FIG. 2a, the load-bearing ball 5, under a first bearing load, is represented of such a small size that the load is borne solely by the balls 5. In FIG. 2b, the contact of a non-load-bearing roller 6 under the first bearing load is represented. In this representation, the diameter difference 7 is exaggerated and is therefore not shown true to scale.

Figure 3:
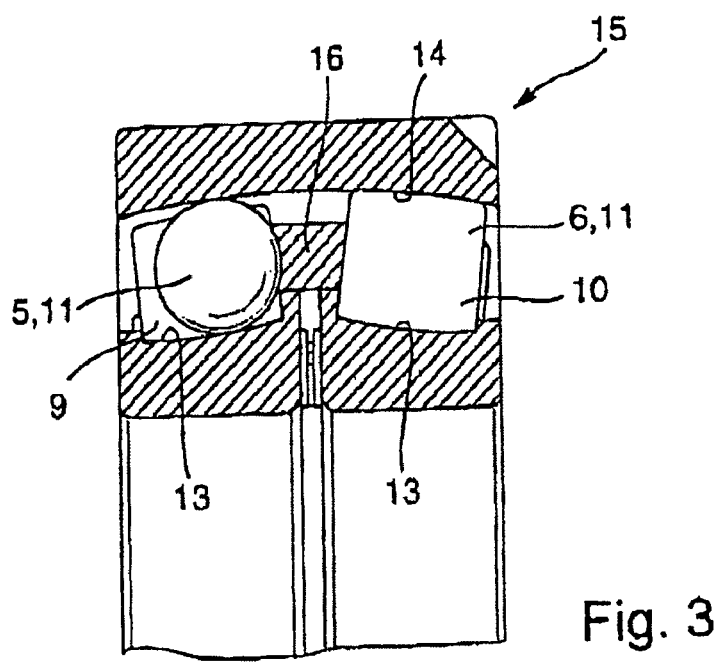
FIG. 3 shows a further illustrative embodiment of a self-aligning antifriction bearing in a part-section.
Figure 4:
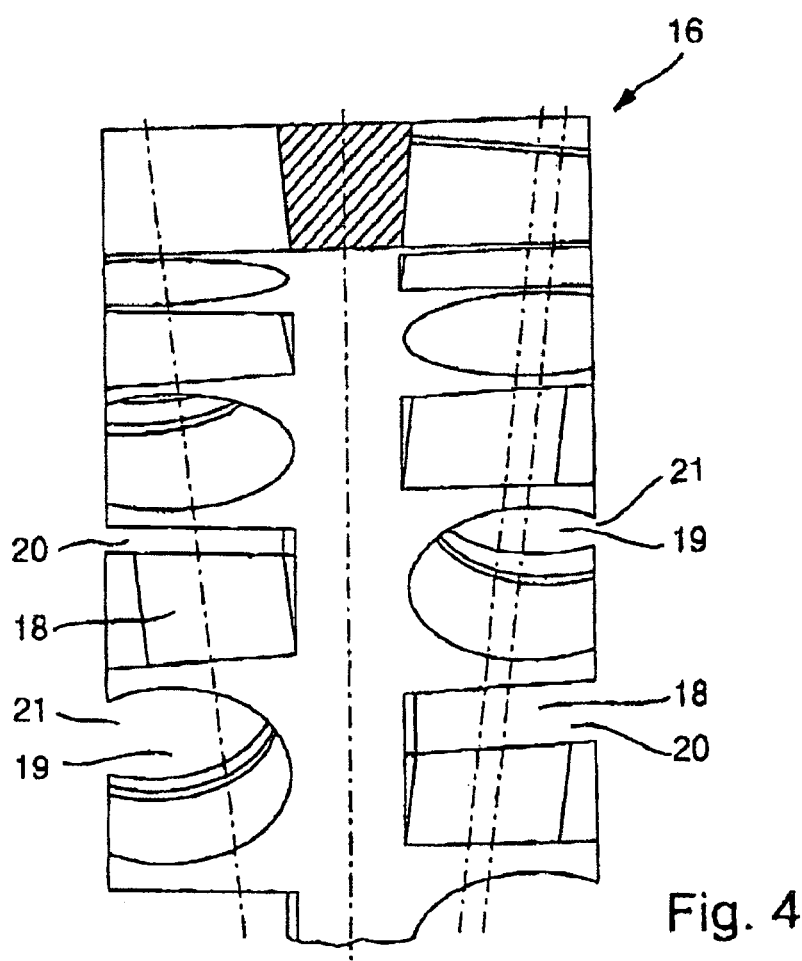
FIG. 4 shows a part-view of the cage of the self-aligning antifriction bearing according to FIG. 3.

FIG. 3 shows a further illustrative embodiment of a self-aligning antifriction bearing 15, comprising a one-part cage 16 which simultaneously guides a first row 9 and a second row 10 of rolling elements 11. Each of the rolling element rows 9 and 10 runs on a common outer raceway 14. To each of the rows 9 and 10 there is respectively assigned, on the inner bearing ring, a separate inner raceway 13. As can be seen, in particular, from a representation of the cage 16 as an individual part detached from the self-aligning antifriction bearing 15, and from the arrangement of the pockets 18 and 19 according to FIG. 4, each of the balls 5 of the first row 9 is adjoined by a roller 6 of the second row 10. The roller pockets 18 and the ball pockets 19 of each of the rows 9 and 10 have openings 20 and 21, respectively, on the lateral end faces of the cage 16, the openings 20 and 21 of one of the rows 9 or 10 being configured jointly on a side of the pockets 18 and 19 which is facing away from the other of the rows 9 or 10.

Figure 5:
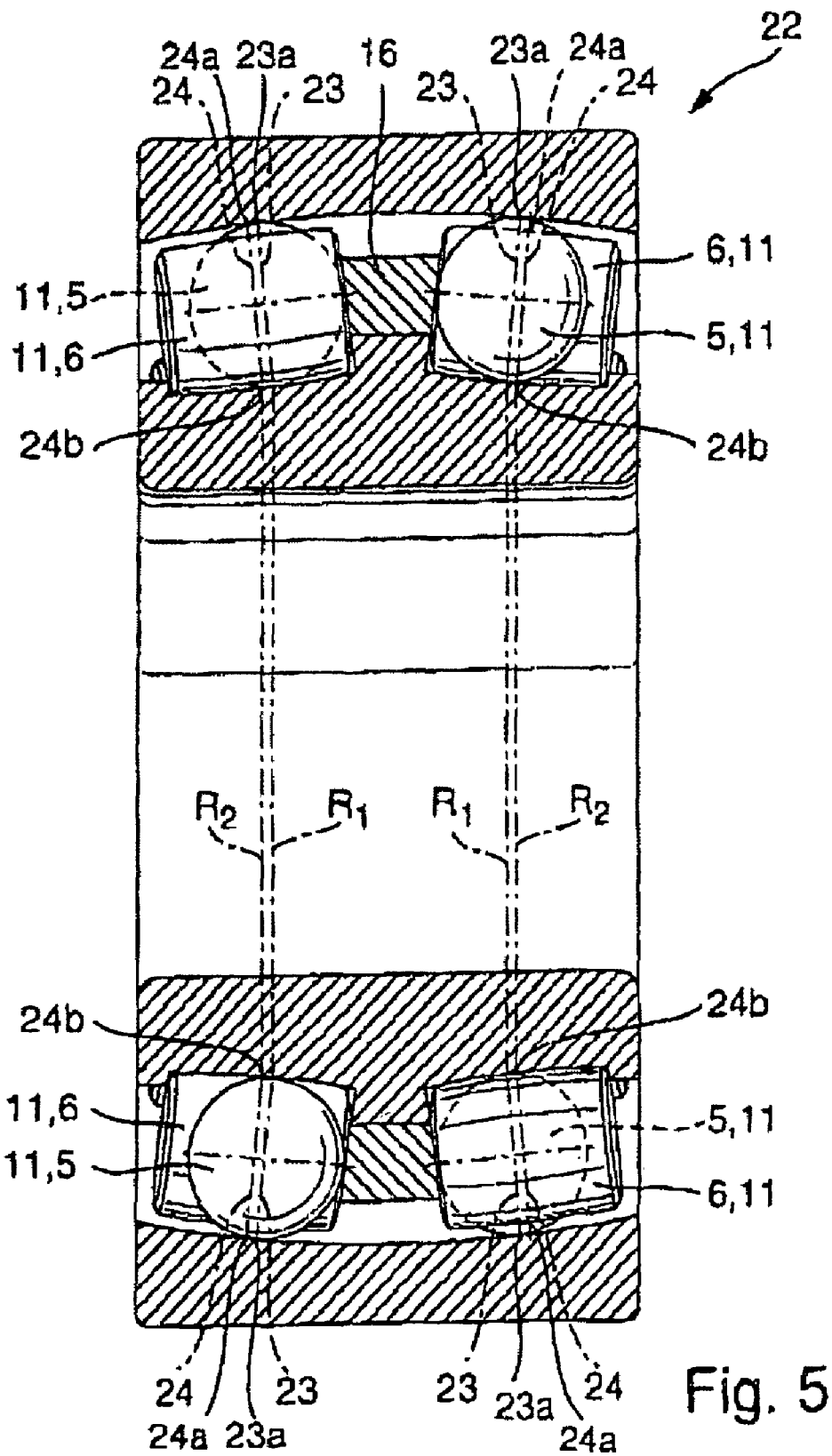
FIG. 5 shows a further illustrative embodiment of a self-aligning antifriction bearing in a longitudinal section.

FIG. 5 shows a self-aligning antifriction bearing 22 comprising the cage 16, the balls 5 and the rollers 6. The imaginary rolling contact planes 23 of the balls 5 of both the first row 9 and the second row 10 are disposed axially between the rolling contact planes 24 of the rollers 6 of the first row 9 and of the second row 10. Consequently, the rolling circle planes 23 in one of rows 9 or 10 are axially distanced from the rolling circle planes 24 in the same row 9 or 10. The rolling contact planes 23 are of annular configuration and are here bounded in the radially outward direction by the outer rolling circle 23a drawn about the balls 5 and in the radially inward direction by the enveloping circle 23b encompassed by the balls 5. The rolling contact planes 23 are inclined relative to a radial plane $R_1$ drawn through the enveloping circle 23b. The rolling contact planes 24 of the rollers 6 are of annular configuration and are here bounded in the radially outward direction by the outer rolling circle 24a drawn about the rollers 6 and in the radially inward direction by the enveloping circle 24b encompassed by the rollers 6. The rolling contact planes 24 are inclined relative to a radial plane $R_2$ drawn through the enveloping circle 24b.

Figure 6:
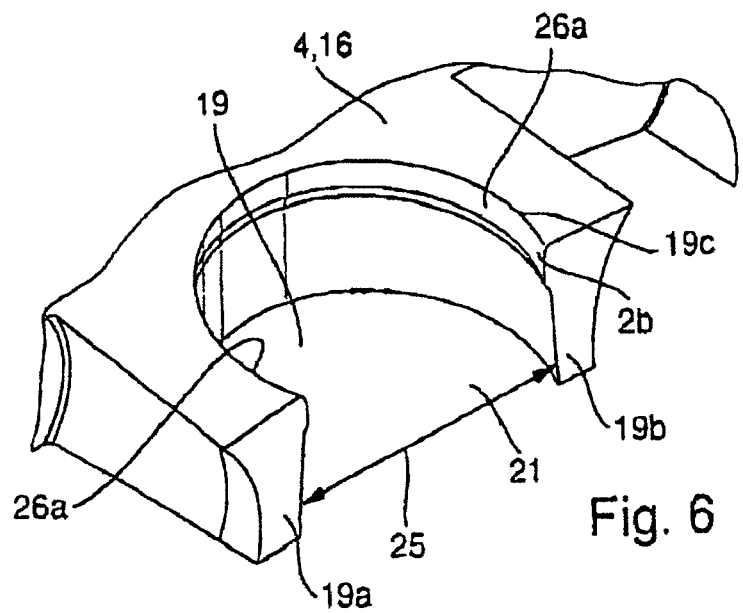
FIGS. 6 to 8 show details of the realization of a ball pocket of an illustrative embodiment of the invention.
Figure 7:
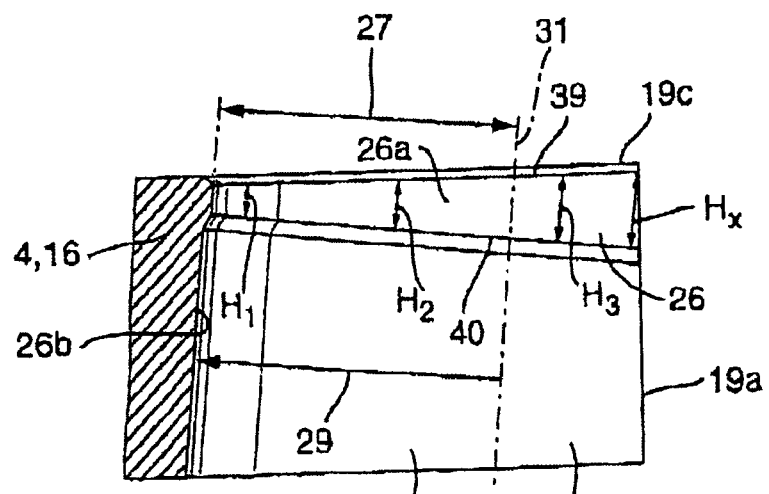
Figure 8:
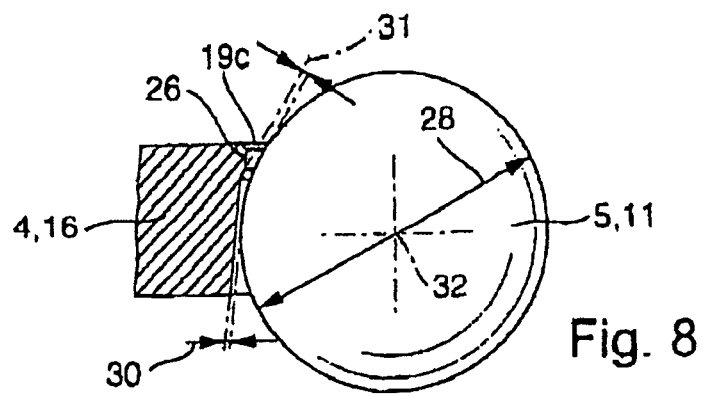

FIGS. 6 to 8 show details of the ball pocket 19, as this is preferably configured on the cages 4 and 16. The tangential free apertural measure 25 between the ends 19a and 19b of the pocket 19 which lie tangentially opposite one another in the peripheral direction about the center axis of the bearing is less than the, within the diameter tolerance of the balls 5, smallest external diameter 28 of the ball 5. The radially outward facing rim 19c of the pocket 19 merges into a flange 26. The clear distance of the mutually opposing surface portions 26a which is largest tangentially in the peripheral direction of the cage 4, 16 and which is described by twice the radius 27 is at least less than the sum of double the radius 29. The radius 29 corresponds to the sum of the external diameter 28 and the motional play 30. The radius 27 here jointly includes the motional play 31 between the ball 5 and the flange 26.

The surface portion 26a of the flange 26 which is facing the ball 5 is a surface portion of a circular cylinder described by the radius 27.

The radius 27 here extends from an axis 31 which lies in the rolling contact plane 23 and which is drawn through the center point 32 of the ball 5. Starting from a side 26b of the flange 26 which is farthest distanced from the opening 21, the height $H_1$, $H_2$, $H_3$ between the body edges 39 and 40, which is directed transversely to the radius 27, increases in the direction of the ends 19a, b, up to the maximum height $H_x$. The flange 26 is followed in the radially inward direction by a surface portion 19d of an inner face of the pocket, having the radius 29.

FIG. 9 shows an ideal state, depicted in schematic and exaggerated representation and not true to scale, of the arrangement and size relationships of rollers 6 and balls 5 in a self-aligning antifriction bearing. The, within the tolerances of the nominal measure of a ball dimension, smallest possible external diameter 28 of the balls 5 is greater than the, within the tolerances of a roller dimension, largest possible external diameter 8 of the roller 6. The rollers 6 and balls 5 are disposed with even spacing T on the periphery of the self-aligning antifriction bearing. In each case, a ball 5 lies peripherally adjacent to a roller 6. The distance 33 in the radian measure between two balls which succeed each other peripherally and which are here mutually separated by one of the rollers 6 is sufficiently small that the radial distance 34 between the roller 6 and the raceway 13 remains. The radial distance 34 is formed between the roller 6, here situated in the vertex 35 of a load zone 36, and the inner raceway 13. In FIG. 9, the load zone 36 is described schematically by the line 36a, which, without numerical specification, indicates in the vertex 35 the highest value of Hertzian stress.

In FIG. 10, at variance with the invention, the distance 37 in the radian measure between the balls 5 is too large, so that, due to the axial sag 38 of the raceway 13 and, where appropriate, due to high elastic deformation of the balls 5 under a first bearing load, the radial distance between the raceways 13 and 14 corresponds to or is smaller than the diameter 8 of the roller 6.

REFERENCE SYMBOLS 1 self-aligning antifriction bearing
2 outer ring
3 inner ring
4 cage
5 ball
6 roller
7 diameter difference
8 diameter
9 first row
10 second row
11 rolling element
12 gap
13 inner raceway
14 outer raceway
15 self-aligning antifriction bearing
16 cage
17 outer raceway
18 roller pocket
19 ball pocket
19a end
19b end
19c rim
19d surface portion
20 opening
21 opening
22 self-aligning antifriction bearing
23 rolling contact plane
23a rolling circle
23b enveloping circle
24 rolling contact plane
24a rolling circle
24b enveloping circle
25 apertural measure
26 flange
26a surface portion
26b side
27 radius
28 external diameter
29 radius
30 motional play
31 axis
32 center point
33 distance
34 distance
35 vertex
36 load zone
36a line
37 distance 38 sag
39 body edge
40 body edge

The invention claimed is:

1. A self-aligning antifriction bearing comprising at least a first row of rolling elements and comprising a second row of rolling elements adjacent to the first row of rolling elements, each of the rows having balls and rollers disposed peripherally about a center axis of the self-aligning antifriction bearing and the balls in this case having a smallest external diameter which is greater than a largest external diameter of the rollers; the self-aligning antifriction bearing further comprising, respectively, an imaginary first rolling contact plane of the balls per row, which plane is concentric to the center axis and runs centrally through the balls, and comprising, respectively, an imaginary second rolling contact plane of the rollers per row, which plane is concentric to the center axis and intersects the rollers at the largest external diameter, in each of the rows the first rolling contact plane being axially distanced from the second rolling contact plane along the bearing center axis.

2. The self-aligning antifriction bearing as claimed in claim 1, in which the first rolling contact planes from row to row lie axially closer together than the second rolling contact planes from row to row, whereby the first rolling contact planes are disposed axially between the second rolling contact planes.

3. The self-aligning antifriction bearing as claimed in claim 1, comprising a first bearing load in which a first rolling circle per row, which encompasses the balls at the external diameter of the balls, is greater than a second rolling circle per row which encompasses the rollers at the largest external diameter of the rollers, and comprising a second bearing load in which the first rolling circle and the second rolling circle are equally large and at least the balls are elastically inflexed at least radially, the second bearing load being greater than the first bearing load.

4. The self-aligning antifriction bearing as claimed in claim 3, in which the balls have a smallest possible external diameter of the balls and the rollers have a largest possible external diameter of the rollers in each of the rows, and in which, in each of the rows, a largest distance in the radian measure between two of the balls which succeed each other peripherally and which are here mutually separated peripherally by at least one of the rollers is respectively sufficiently small that, in a vertex of a load zone resulting from a highest one of the first bearing load, between an inner raceway of the self-aligning antifriction bearing and an outer raceway of the self-aligning antifriction bearing a radial distance remains which is greater than the largest external diameter of the rollers, the rolling elements being disposed radially between the raceways.

5. The self-aligning antifriction bearing as claimed in claim 1, in which per row, in the peripheral direction about the center axis, respectively one of the balls is adjacent to one of the rollers.

6. The self-aligning antifriction bearing as claimed in claim 1, comprising a cage, the first row and the second row being jointly guided in the cage.

7. The self-aligning antifriction bearing as claimed in claim 1, comprising a cage, the first row and the second row being jointly guided in the cage and a ball of the first row respectively being adjoined by a roller of the second row.

8. The self-aligning antifriction bearing as claimed in claim 1, comprising a cage, the first row and the second row being jointly guided in the cage and a ball of the first row respectively being adjoined by a peripheral gap in the second row between a roller and a ball.

9. A cage for at least one of the rows of the self-aligning antifriction bearing as claimed in claim 1, which cage has ball pockets with, respectively, a lateral opening, each of the openings being configured on a side of the cage which is facing away from the other of the rows, and a, in the tangential direction, free apertural measure of the opening being smaller than the external diameter of the ball.

10. The cage as claimed in claim 9, having respectively a flange on a radially outward facing rim of each of the ball pockets the largest clear distance, at least between portions of the flange which lie tangentially opposite one another in the peripheral direction and are in this case farthest removed from one another, being less than the external diameter of the ball in the pocket, plus a greatest possible motional play, free in the direction of the pocket, between the pocket and the respective ball radially beneath the flange, and the largest clear distance including a greatest possible free motional play between the ball and the flange.

11. The cage as claimed in claim 10, in which the rim of each of the ball pockets is formed by the flange extending as far as the opening.

12. The cage as claimed in claim 11, in which the flange has an inner surface portion of a circular cylinder, the surface portion facing the ball in the pocket and, peripherally, partially encompassing the ball as far as the opening and being described by a radius.

13. The cage as claimed in claim 12, the surface portion of which is bounded by two body edges, the body edges facing the ball in the pocket and partially encompassing the ball as far as the opening, and the body edges at the opening, viewed transversely to the radius, being farthest distant from one another and, as the distance away from the opening increases, viewed transversely to the radius, coming closer together.

* * * * *